Sept. 19, 1972    J. L. HUGUET    3,692,636
SEPARATION OF A MIXTURE COMPRISING VINYL ACETATE, ETHYL
ACETATE, AND ACETIC ACID BY DISTILLATION
Filed Nov. 28, 1969
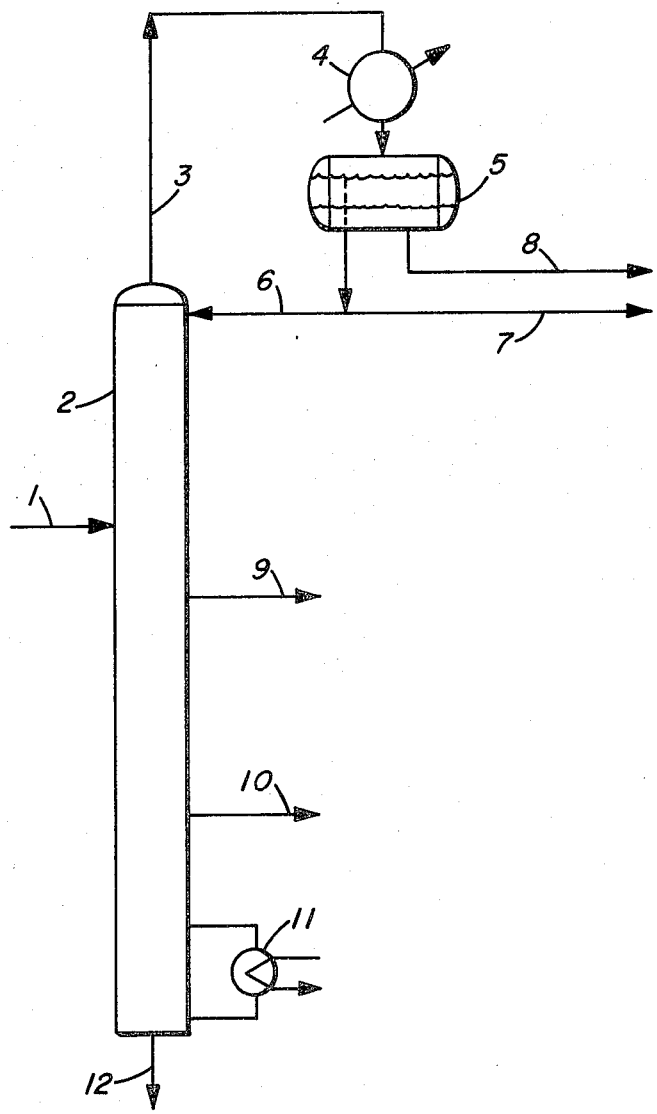

United States Patent Office

3,692,636
Patented Sept. 19, 1972

3,692,636
SEPARATION OF A MIXTURE COMPRISING
VINYL ACETATE, ETHYL ACETATE, AND
ACETIC ACID BY DISTILLATION
Juan L. Huguet, Corpus Christi, Tex., assignor to
Celanese Corporation, New York, N.Y.
Filed Nov. 28, 1969, Ser. No. 880,957
Int. Cl. C07c 67/06
U.S. Cl. 203—71                                           16 Claims

ABSTRACT OF THE DISCLOSURE

Vinyl acetate substantially free from heavy ends is separated by an azeotropic distillation method from a crude mixture comprising vinyl acetate, water, ethyl acetate, and acetic acid such as the reaction product obtained in the reaction of ethylene and acetic acid in the presence of molecular oxygen and a catalyst to form vinyl acetate. When the vinyl acetate-forming reaction is carried out in the liquid phase in the presence of a noble metal and a redox agent, the crude product also typically contains 1-acetoxy-1-butene, which is also separable from the vinyl acetate by the present process with minimum formation of butyraldehyde, product contamination by which is a problem in the prior art vinyl acetate recovery processes. The process comprises azeotropically distilling the vinyl acetate out of the crude feedstock in a column operated to maitain the temperature breakpoint below the feed point. Unusually effective separation of vinyl acetate from higher-boiling compounds such as ethyl acetate obtains. In a particular embodiment, ethyl acetate, dioxolane, and other compounds boiling between vinyl acetate and acetic acid are removed in a side stream drawn from the column in the vicinity of the temperature breakpoint.

BACKGROUND OF THE INVENTION

Vinyl acetate can be produced by reacting ethylene and acetic acid in the presence of a catalyst and an oxidant, which may be a redox agent in an oxidized state or a combination of redox agent and molecular oxygen. Such a process is described in U.S. Pat. No. 3,277,158, which describes contacting ethylene and molecular oxygen with a reaction medium comprising acetic acid and containing a noble metal (palladium) catalyst, halide ions, an alkali metal acetate, and a cupric or ferric redox agent. In another closely related process, the ethylene alone (without the oxygen) is contacted with the reaction medium containing the catalyst and the redox agent in its higher valence state; the reaction medium, after being contacted with the ethylene, is withdrawn to a separate regeneration vessel in which it is contacted with oxygen or air for the purpose of restoring the reduced redox agent to its higher valence state.

In the processes just described, designated "liquid-phase" processes because the catalyst system is dissolved in a liquid reaction medium, a wide range of reaction by-products is formed. Ethyl acetate, dioxolane, butyraldehyde, methyl ethyl ketone, and vinyl propionate are present in particular, although the butyraldehyde content may be so low as to be barely detectable; all compounds are very difficult to separate from vinyl acetate by ordinary distillation methods. In addition, 1-acetoxy-1-butene is also formed in the vinyl acetate reactor and is present in the crude product. While this latter compound is not difficult to separate from vinyl acetate, having a much higher boiling point than vinyl acetate, it is also, as a consequence of hydrolytic decomposition during the product separation process, a precursor for butyraldehyde, which, in liquid-phase vinyl acetate processes employing prior-art separation methods, has been observed to be a very troublesome contaminant of the finished product and one which it is very difficult to remove except by comparatively expensive treatment with chemical reagents such as, for example, bisulfites. Small amounts of butyraldehyde are present in the vinyl acetate reaction product itself. The amount is enough to affect product quality seriously even though it may be barely detectable in the vinyl acetate reactor product.

In addition to the liquid-phase processes just described, there have been developed more recently so-called "vapor phase" processes, in which a gaseous mixture of ethylene, acetic acid, and oxygen is passed over a solid supported noble metal catalyst. In the vapor phase processes the major by-product which causes difficulty in purifying the vinyl acetate product is ethyl acetate. Some of the higher-boiling by-products, such as 1-acetoxy-1-butene, are not present in any great quantity. Ethyl acetate itself, however, presents difficulties in the product separation operations, as will be explained below.

Considering ethyl acetate alone as the by-product which must be removed from the vinyl acetate product in all cases, the art heretofore has recognized that the separation is very difficult and entails either the use of a very large number of distillation trays or else the use of a water-extractive distillation through which, as taught in U.S. Pat. 3,458,406 ethyl acetate is separated in an aqueous base stream from vinyl acetate which is recovered, as the azeotrope, in the distillate.

Considering the water-extractive distillation approach, this is effective and economical when the crude feedstock does not contain very large quantities of acetic acid, which, of course, would be recovered in the aqueous residue stream. When acetic acid is present in the feedstock, such an extractive distillation will result in recovery of the acetic acid in an aqueous form, and if it is to be reused in an environment in which dryness is desired (e.g. the vinyl acetate-forming reaction), an additional drying step is necessary.

Considering the separation of ethyl acetate and vinyl acetate by "dry" distillation, i.e. non-extractive distillation, the prior art is exemplified by U.S. Pat. No. 3,277,158, which teaches a process in which, after two preliminary distillations in which light ends (acetaldehyde and methyl acetate) are removed from the crude reaction product, vinyl acetate is then distilled out as the water azeotrope in admixture with the ethyl acetate. (Acetic acid is withdrawn as the residue and recycled to the vinyl acetate reaction system.) The vinyl acetate-ethyl acetate mixture recovered as distillate is then forwarded to, first, a drying step in which water is removed and then to a final dry distillation in which vinyl acetate is recovered as distillate and ethyl acetate is drawn off as the residue. This final, finishing distillation always requires a large number of trays and even so yields product of borderline quality.

There are other by-products, which are formed especially in the liquid-phase processes which also cause great difficulty in recovering a commercially-pure vinyl acetate product but which have not generally been recognized as sources of difficulty in the prior art. In particular, 1,3-dioxolane is present and is very difficult to remove from vinyl acetate by simple distillation. Methyl ethyl ketone and vinyl propionate similarly present problems, as well as butyraldehyde. Butyraldehyde, as noted above, is a particularly undesirable contaminant which has been considered heretofore to be simply a by-product in the vinyl acetate-forming reaction which could be dealt with only by chemical treatment with, for example, a bisulfite wash.

The primary object of the present invention is to provide a simple and effective method for resolving a crude stream comprising at least vinyl acetate, ethyl acetate, water, and acetic acid into a distillate comprising vinyl acetate having a greatly reduced proportion of heavy ends, the term "heavy ends" being intended to mean compounds which are higher boiling than vinyl acetate and including both comparatively volatile compounds such as ethyl acetate and much less volatile compounds such as 1-acetoxy-1-butene.

Another object is to provide a method for recovering vinyl acetate comparatively free of heavy ends from a feedstock which, in addition to the components just named, also comprises 1,3-dioxolane, methyl ethyl ketone, butyraldehyde, vinyl propionate, and 1-acetoxy-1-butene.

Another object is to provide a method for minimizing the formation of butyraldehyde during the recovery, by distillation, of vinyl acetate from a feedstock comprising 1-acetoxy-1-butene.

Yet another object is to provide a method for economically recovering vinyl acetate comparatively free from the heavy ends named above while also recovering acetic acid in a substantially anhydrous condition suitable for recycle to the reaction step of a process in which ethylene and acetic acid are reacted catalytically to form vinyl acetate.

Other objects of the invention will be apparent from the following detailed description and examples.

BRIEF SUMMARY OF THE INVENTION AND DESCRIPTION OF THE DRAWING

In accordance with the present invention a crude feedstock comprising vinyl acetate, acetic acid, water, ethyl acetate, and any or all of the other reaction by-products named above which may be present in the feedstock is introduced through a conduit 1 as shown in the drawing into a distillation column 2 at a point intermediate between the top and the base thereof and in which the temperature breakpoint is maintained at a location not higher than the feed point. The column is operated to produce through conduit 3 a distillate comprising the vinyl acetate-water azeotrope as well as any components more volatile than vinyl acetate (e.g. acetaldehyde) which may be in the feedstock. After being condensed in condenser 4, the distillate is cooled until it separates into two liquid phases in distillate receiver-decanter 5, of which the lower (aqueous) phase, comprising predominantly water, is withdrawn through conduit 8 and, if desired, processed further to recover its organic components. The upper, non-aqueous, phase comprises predominantly vinyl acetate which contains a surprisingly low amount of the heavy ends, such as ethyl acetate, previously named. Part of this upper phase is withdrawn through conduit 7 as product, or for such finishing purification as may be desired. Part is returned to the distillation column as reflux through conduit 6, in an amount sufficient to insure the removal, in the distillate, of substantially all the water contained in the feedstock. Boilup heat is supplied to the base of the column by a reboiler 11 in an amount sufficient to insure that the base stream withdrawn from the column through conduit 12 does not contain more than about 1% water by weight, but at a rate which is less than that rate at which the temperature breakpoint in the column is driven upward to a level higher than the feedpoint. By "temperature breakpoint" is meant that level in the column at which the rate of change of the temperature gradient from one tray to the next is at a maximum. That is, it is the point (e.g. tray) at which the second derivative is at the maximum in a plotted curve of temperature versus tray location. This term is familiar to those experienced in the art of distillation. If the column is not a tray-type column, e.g. if it is a packed column, the temperature breakpoint is that position in the column at which the rate of change of temperature gradient per unit of column height is at a maximum.

When the column is operating with the breakpoint not higher than the feed tray as explained above, the high-boiling compounds, including ethyl acetate, can be withdrawn in a drawoff taken below the feed point in one of two ways:

(1) The high-boiling compounds are simply withdrawn through conduit 12 in the base stream, which typically comprises predominantly acetic acid and which is essentially anhydrous (containing about 1 weight percent water or less).

(2) In a preferred embodiment, ethyl acetate and, if they are present in the feedstock, methyl ethyl ketone, butyraldehyde, vinyl propionate, and 1,3-dioxolane are removed from the column in a purge stream which is withdrawn through a conduit 9 in the immediate vicinity of the temperature breakpoint. High-boiling compounds of very low volatility, such as 1-acetoxy-1-butene, are withdrawn at or near the base of the column with the acetic acid base stream. Acetic acid can also be withdrawn as a vapor sidestream through a conduit 10.

This mode of operation has been found to be surprisingly effective, and can produce a vinyl acetate-containing distillate which is so pure as to require very little additional purification other than the removal of light ends such as acetaldehyde and methyl acetate, which is easily accomplished by methods known in the art.

In addition to the fact that the distillation method just described is surprisingly effective in removing such high boiling compounds as ethyl acetate from the vinyl acetate product, an important aspect of the invention lies in its application in solving the problem resulting from the fact that 1-acetoxy-1-butene decomposes to yield butyraldehyde and that the decomposition is accelerated in aqueous media. When the crude vinyl acetate reaction product is distilled by the process of the present invention, the 1-acetoxy-1-butene is rapidly removed from an aqueous environment existing in the feed mixture and in the upper portion of the column where water is present in significant quantities and is dropped into the essentially anhydrous lower section of the column, where conditions are not conducive to butyraldehyde formation. In a preferred embodiment of the invention the acetic acid base stream is then freed from the 1-acetoxy-1-butene (which is less volatile than acetic acid) by distillation before the acetic acid is recycled to the vinyl acetate-forming reaction step.

With respect to butyraldehyde and 1-acetoxy-1-butene in particular, the use of this invention yields results which are particularly surprising. For example, in a distillation in which substantial quantities of water are present in the base of the tower, 1-acetoxy-1-butene forms a water azeotrope and appears in the distillate along with increased amounts of butyraldehyde formed by hydrolysis of the acetoxy butene. Conversely, when the distillation is conducted in a tower in which the upper and the lower sections of the tower contain no water, butyraldehyde, which is a particularly objectionable impurity in the vinyl acetate reaction product, appears in the distillate in surprising and highly objectionable quantities. However, by employing the present process, in which the upper portion of the tower contains water while the lower is dry, both butyraldehyde and 1-acetoxy-1-butene are effectively separated into the stream or streams withdrawn from a tower below the feed point, and, in addition, formation of butyraldehyde in the tower is minimized because, as mentioned above, contact of the 1-acetoxy-1-butene with substantial quantities of water is minimized.

DETAILED DESCRIPTION OF THE INVENTION

Feedstock mixtures

In its simplest form the invention is applicable in separating mixtures of vinyl acetate, ethyl acetate, and acetic acid. Water is also ordinarily present, and is essential in the distillation column, in which vinyl acetate is recovered as the water azeotrope. While water-free feedstock mixtures are ordinarily not encountered, it will be recognized that a dry mixture of vinyl acetate, ethyl acetate, and acetic acid can be separated if sufficient water is added to the feed to azeotrope the vinyl acetate contained in it. Ordinarily water is already present, and the following discussion and claims are based on this assumption.

Acetaldehyde is also ordinarily present, in very small amounts in the product of the vapor-phase vinyl acetate process and in an amount of about 4% to 10% in vinyl acetate from the liquid-phase process, but it behaves as a simple light end to the vinyl acetate and presents no problems. Whether the feedstock is distilled by the ordinary processes of the prior art or whether it is processed by the present invention, any acetaldehyde contained in the feedstock will be distilled overhead with the vinyl acetate. Its separation from the vinyl acetate-containing condensate in subsequent distillations is straight-forward, and there is no serious problem with acetaldehyde contamination of the finished product.

When vinyl acetate is produced by the liquid-phase processes discussed above, the crude reaction product with the separation of which the present invention is concerned is always a complex mixture. Whether the product is recovered from the vinyl acetate reactor by condensing the liquid components out of the gases (comprising unreacted ethylene) withdrawn from the reactor or whether the liquid reaction medium itself is drawn from the reactor for recovery of its volatile components by distillation, there are always present, in addition to acetaldehyde, methyl acetate, other light ends, vinyl acetate, acetic acid, and water a large number of other components referred to herein as heavy ends. Although these latter compounds are described here as heavy ends, they actually exist in two categories as regards volatility. The first of these categories, which might be described as intermediate-boiling compounds (i.e. boiling between vinyl acetate and acetic acid) comprises 1,3-dioxolane, methyl ethyl ketone, butyraldehyde, crotonaldehyde, 2-methyl-1,3-dioxolane, and vinyl propionate. The second category includes compounds which, except when they form relatively low-boiling azeotropes, are less volatile than acetic acid. Included in this category are most of the acetoxy-1-butenes and 2-bentenes, with 1-acetoxy-1-butene being of the greatest importance insofar as the problem of purifying vinyl acetate is concerned, 2-chloroethanol, 2-chloroethyl acetate, ethylene glycol diacetate, ethylene glycol monoacetate, and ethylidene diacetate.

Of the compounds just named, the group which is lower in volatility than acetic acid poses no difficulties as regards purity of the vinyl acetate-containing distillate recovered from the column so long as (1) the temperature breakpoint is maintained below the feed point (2) boilup heat is supplied to the base of the column at a rate sufficient to maintain substantially water-free conditions in the column base, and (3) enough vinyl acetate is introduced into the column to remove all water overhead as the vinyl acetate azeotrope. This is even the case with the 1-acetoxy-1-butene, which in any other distillation system is a source of difficulty.

The intermediate-boiling group of compounds poses greater problems, being comparatively close to vinyl acetate in boiling point. However, if the temperature breakpoint in the column is kept at a location not significantly higher than the feed point and if sufficient vinyl acetate is supplied to the column in the feedstock and in the reflux to remove substantially all of the water contained in the feedstock overhead as the vinyl acetate azeotrope (whereby the vinyl acetate has been found to azeotrope the water preferentially as compared with these other compounds), a distillate can be obtained in which the ratio of these intermediate-boiling high boilers to vinyl acetate is very much reduced as compared with the initial feedstock. It is, in fact, possible to produce a distillate which meets or nearly meets commercial specifications with regard to the amount of, for example, butyraldehyde contained therein.

Of the compounds named above ethyl acetate is always present in the crude feedstock regardless of the source. If the feedstock is derived from a liquid-phase vinyl acetate process, 1,3-dioxolane will also be present with methyl ethyl ketone, butyraldehyde, and vinyl propionate from the intermediate-boiling group of compounds discussed above along with 1-acetoxy-1-butene from the higher-boiling group. Other intermediate-boiling and higher-boiling compounds as identified above are also usually present, but if the column is operated so as to keep the compounds just named out of the overhead stream, all of the other compounds will cause no difficulty and will be removed in drawoff streams removed below the feed point as will be discussed more fully below.

Aside from the product quality problems due to contamination of the vinyl acetate product with the various by-products identified above, there is in addition a corrosion problem due to chlorinated by-products which are formed in the liquid-phase vinyl acetate process. The 2-chloroethanol and 2-chloroethyl acetate mentioned above exemplify this class of by-product, the 2-chloroethanol being of intermediate volatility such that its water azeotrope tends to contaminate the vinyl acetate-containing condensate produced from a distillation column operating with an excess of water. The 2-chloroethyl acetate is a heavy end which does not itself tend to contaminate the vinyl acetate but which, if there is water in significant quantities in the base of the column, will hydrolyze to form 2-chloroethanol, which does contaminate the vinyl acetate as just described. By the application of the present process to a crude feedstock containing either or both of these chlorinated compounds, difficulties due to their presence in the feedstock are minimized for two reasons. First, operation of the column with a low temperature breakpoint and with enough vinyl acetate being fed to remove substantially all the water overhead as the vinyl acetate azeotrope reduces product contamination by the 2-chloroethanol and also minimizes the hydrolysis of 2-chloroethyl acetate which forms additional quantities of the 2-chloroethanol. Second, since the operation of the column according to the present invention results in the rapid translation of both the chloroethanol and the chloroethyl acetate to a dry environment (i.e. the lower portion of the column) in which hydrolytic decomposition to produce hydrogen chloride is much slower than in a column operating with substantial amounts of water in the base, corrosion of the column and its auxiliaries is greatly reduced or, alternatively, the need to inject acid scavengers, e.g. alkaline-reacting compounds such as sodium acetate, into the column is reduced with a resultant decrease in fouling of the reboiler by sodium chloride deposits. Additionally, and even more importantly, hydrogen chloride catalyzes hydrolytic decomposition of many of the components of the feedstock to compounds which contaminate the product, e.g. 1-acetoxy-1-butene forms butyraldehyde, and the vinyl acetate itself is decomposed to acetaldehyde. Minimizing hydrogen chloride formation minimizes these undesired side reactions.

Concentration gradients within the column

It has been discovered that, in the immediate vicinity of the temperature breakpoint in the column, there is a pronounced "bulge" of the contaminants the presence of which causes the greatest difficulty in producing commercially pure vinyl acetate, e.g. ethyl acetate, butyraldehyde, 1,3-dioxolane, methyl ethyl ketone, and vinyl propionate as well as the other intermediate boiling impurities identified above. By "bulge" is meant a zone in which the concentration of the compound in question is higher than in the regions above and below the bulge. There is no 1-acetoxy-1-butene bulge if the column is essentially dry below the feed point, but concentration of this component increases steadily as the base of the column is approached, especially when the temperature breakpoint is held below the feed point. By controlling the operation of the column so that the temperature breakpoint, and therefore the bulge, is at a level no higher than the feed point, it has been discovered that a purge stream can be withdrawn in the immediate vicinity of the breakpoint, preferably immediately at the breakpoint, which will contain these intermediate-boiling compounds in very high concentration with a minimal content of vinyl acetate and acetic acid. Thus these compounds are conveniently withdrawn from the system, for whatever disposal is considered expedient, and also, by reducing their concentration in the column, the efficacy of the trays in the stripping and rectifying sections of the column is enhanced because the concentration of these compounds has been lowered.

The higher-boiling impurities such as the acetoxy butenes and the glycol acetates concentrate in the base of the column with the acetic acid. They present no difficulty when the intermediate-boiling group of compounds is being withdrawn as explained above. They are simply withdrawn in the dry acetic acid base stream, and can be subsequently removed from it by simple distillation (in which the acetic acid is recovered as distillate) if desired.

If the column is operated so as to lower the "bulge" to the vicinity of the base, i.e. leaving a significant number of trays between the break-point and the feed point, it becomes possible, if desired, to remove in the base stream both the intermediate-boiling compounds (e.g. butyraldehyde, ethyl acetate, and methyl ethyl ketone) and the higher-boiling compounds such as the acetoxy butenes. As regards purity of the vinyl acetate produced, this embodiment of the invention is as efficacious as that in which a separate purge stream is withdrawn at the breakpoint, but it of necessity implies that purification of the acetic acid withdrawn from the column base will entail separating the acetic acid from both a light ends cut (e.g. ethyl acetate) and a heavy ends cut (e.g. ethyl acetate) and a heavy ends cut (e.g. the acetoxy butenes).

Column operating conditions

The distillation phenomena with which the process is concerned are not limited to any particular pressure or range of pressures within the range of pressures generally employed in the art in distilling vinyl acetate. Preferably the distillation is conducted at the lowest pressure at which, with the condenser cooling medium available, the distillate can be condensed in a condenser of reasonable size. By using a chilled cooling medium it is possible to operate the column at sub-atmospheric pressure, which results in minimal degradation of the product. Practical considerations of cooling water temperature, however, result in the need to operate at pressures around 1 to 2 atmospheres absolute measured at the head of the column. Vinyl acetate polymerization becomes an increasing problem at head pressures much greater than about 4 atmospheres absolute. In this connection it is to be noted that, although it is not essential and is not a part of the invention, the use of a polymerization inhibitor such as hydroquinone within the distillation column, introduced conveniently in the reflux stream, is advantageous in preventing loss of product and fouling of the apparatus due to polymerization of the vinyl acetate. Typically the inhibitor is employed in concentrations of about 50 p.p.m. in the reflux.

The reflux ratio will, as is recognized in the art, depend upon feed composition and number of trays in the column. There is no upper limit to the reflux ratio that may be employed, but the lower limit is that at which the total vinyl acetate introduced into the column in the crude feed and in the reflux is sufficient to form the vinyl acetate-water azeotrope with substantially all of the water introduced into the column (after allowing for a water concentration of up to about 1% by weight in the acetic acid withdrawn from the base of the column). Typically, with a feedstock containing about 58 weight percent acetic acid, 23 weight percent vinyl acetate, and 9 weight percent water, with the remainder being a mixture of the organic by-products discussed above, a reflux to feed ratio of about 2:1 has been found to be adequate in a column having 60 trays, operating at substantially atmospheric head pressure, with the feed point at tray No. 40 counting from the bottom of the column and with the temperature breakpoint maintained between about tray No. 15 and Tray No. 30. When a purge stream is being withdrawn from the column at the temperature breakpoint, it is recommended for optimum separation efficiency that this stream contain no more than a nominal amount of water, e.g. about 5 weight percent or less. As the water content of the purge stream is allowed to increase above this approximate level, there will be increasing difficulty caused by the appearance of the water azeotropes of some of the heavy ends in the distillate.

Boilup heat is supplied to the base of the column at a rate, as noted above, which is at least sufficient to strip from the acetic acid stream withdrawn from the lower portion of the column all water which is in excess of about 2 weight percent in this stream, preferably all water in excess of about 1 weight percent and more preferably all water in excess of about 0.2%. An even higher degree of water stripping can be employed if desired, i.e. the water can be stripped to a level as low as about 0.1 weight percent or so, but although desirable this is not essential.

The above identifies the minimum boilup rate to be employed. The maximum boilup rate is that rate at which the temperature breakpoint is driven to a level in the column that is higher than the immediate vicinity of the feed point. The boilup rate should be controlled so that the temperature breakpoint will be no higher than the feed point, preferably at least about 10 trays below the feed point. As is known to those skilled in this art, of course, increasing the boilup rate raises the temperature breakpoint and vice-versa.

When operating the column with a purge stream of intermediate boiling compounds taken above the base stream in which acetic acid and the higher-boiling compounds are withdrawn, the temperature breakpoint should be positioned below the feed point but several trays above the base of the column (in order to avoid excessive loss of acetic acid in the purge). When operating the column in such a manner that all the high-boiling compounds including the intermediate-volatility compounds such as ethyl acetate are withdrawn with the acetic acid-containing base stream, the temperature breakpoint is lowered to a position near the base of the column.

More specifically, concerning the positioning of the breakpoint and also with respect to the recommended number of trays, the following conditions are preferred but not critical:

(a) When the column is operated to produce both an acetic acid-containing base stream and a purge stream comprising the intermediate-boiling compounds such as ethyl acetate, it is recommended that the column have at least about 40 trays, with the feed point being located at about tray No. 30 (counting from the bottom), the temperature breakpoint and the purge stream withdrawal point being at about tray No. 18, and the reflux being introduced onto the top tray (tray No. 40). Preferably the column should have about 60 trays, with the feed point being located at about tray No. 40, the temperature breakpoint and the purge stream withdrawal connection being between about tray No. 20 and tray No. 30, preferably about tray No. 22, and the reflux being introduced onto tray No. 60.

(b) When the column is to be operated with both the acetic acid and the intermediate-boiling compounds such as ethyl acetate being removed together in one base stream, it is recommended that the column have at least about 55 trays, with the feed point being located at about tray No. 40 (counting from the bottom), the temperature breakpoint being located between about tray No. 15 and tray No. 20, preferably on about tray No. 18, and reflux introduced onto tray No. 55. A useful variant of this particular embodiment is one in which a few additional trays, e.g. about 7 to 15 trays, are inserted below the acetic acid drawoff connection and with a reboiler designed for high temperature and fouling conditions being employed beneath these additional trays. In this embodiment those high boiling compounds which are less volatile than acetic acid, e.g. ethylene glycol and 1,1-ethanediol acetates and acetoxy butenes, are withdrawn from the reboiler and the acetic acid is withdrawn as a sidestream in which the major components other than acetic acid itself are the intermediate-boiling compounds such as ethyl acetate, dioxolane, vinyl propionate, butyraldehyde, etc. Formic acid will also be contained in this stream. This same process variant, i.e. withdrawal of the actice acid as a sidestream with the least-volatile components of the feedstock being withdrawn as a residue from the reboiler cycle, can also be employed if desired with the system described in (a) above.

The following examples are given to illustrate the invention further. It will be recognized that many variations may be made therefrom within the scope of the invention.

EXAMPLE I

A crude feedstock was employed which consisted of the crude vinyl acetate-containing product recovered from the reaction system of a process in which ethylene, acetic acid, and molecular oxygen were being reacted in the presence of a liquid reaction medium containing palladous ions, a cupric redox system, and an alkali metal acetate to form vinyl acetate. In this reaction system the crude vinyl acetate-containing reaction product is recovered, prior to being purified to recover the vinyl acetate, by condensing the condensable components of the gases (comprising predominantly ethylene) evolved from the vinyl acetate reactor. The crude feedstock had the following composition:

| | |
|---|---|
| Vinyl acetate, wt. percent | 25.1 |
| Water, wt. percent | 9.0 |
| Acetic acid, wt. percent | 55.0 |
| Acetaldehyde, wt. percent | 6.0 |
| Formic acid, wt. percent | 1.0 |
| Ethyl acetate, p.p.m. | 1233 |
| 1,3-dioxolane, p.p.m. | 64 |
| Methyl ethyl ketone, p.p.m. | 22 |
| Crotonaldehyde, p.p.m. | 315 |
| 3-acetoxy-1-butene, p.p.m. | 890 |
| 1-acetoxy-1-butene, p.p.m. | 720 |
| Butyraldehyde, p.p.m. | [1] 3 |

[1] At 3 p.p.m., butyraldehyde concentration is near detectable limit, but a finite amount was known to be present.

The above described feedstock was continuously charged, at a rate of approximately 5.7 ml. per minute, to a preheater in which it was preheated to approximately 70° C. From the preheater the crude feedstock, as a liquid at about the bubble point, was continuously introduced onto the 40th tray (counting from the bottom) of a 60-tray one-inch distillation column operating at substantially atmospheric head pressure. The column head was connected to a condensation system which included a decanter for separating two liquid phases into which the condensate separated at the temperature maintained in the decanter (about 12° C.). A connection was provided for withdrawing the lower, aqueous, phase from the decanter, and another connection was provided for withdrawing from the top (non-aqueous) phase a vinyl acetate distillate stream, part of which was drawn off as product while part, by means of a metering pump, was pumped through a reflux preheater and reintroduced onto the top tray of the column as hot reflux at about 59° C. Vinyl acetate product drawoff rate was approximately 1.7 ml. per minute, the aqueous phase was drawn off from the decanter at about 0.6 ml. per minute, and reflux was returned to the column at approximately 21 ml. per minute.

A polymerization inhibitor solution, which was a 1% solution of hydroquinone in acetic acid and which also contained 1% sodium acetate for use as a strong acid neutralzing agent, was introduced continuously into the reflux stream at about 0.042 gram per minute. An additional supply of sodium acetate, a 1% solution in acetic acid, was introduced into the column at tray 20 at approximately 0.77 gram per minute.

The base of the column was provided with an electrically-heated reboiler which was of the thermosyphon type and from which, actuated by a controller sensing liquid level in the reboiler, an acetic acid base stream was drawn off. Base drawoff rate was approximately 3.1 grams per minute, and the drawn-off residue was sampled periodically and analyzed for water content.

Means were provided for observing the temperature at the base of the column and at the 10th, 20th, 40th, and 60th trays of the column. A connection was provided for withdrawing a purge stream, at a controlled rate, from tray No. 20.

A temperature controller, sensing the temperature between trays 20 and 21 and actuating an electric winding on the reboiler, was employed to control the boilup at a rate such as to maintain a constant temperature of approximately 93° C. between trays 20 and 21. The breakpoint control temperature of 93° C. had been set in preliminary experiments in which the "temperature profile," that is a plot of column temperature versus tray location, was first determined with the column operating without a purge drawoff. From the tray at which, according to the plotted temperature profile, the temperature breakpoint occurred, a purge drawoff was then instituted in an amount such that the drawn-off stream contained about 30 weight percent vinyl acetate (a condition under which the greater portion of the intermediate-boiling impurities such as ethyl acetate was being removed without suffering an excessive vinyl acetate loss). With the purge being drawn off in this manner, the temperature profile was determined again and, if the observed breakpoint was not substantially at the location of the drawoff, the boilup and reflux were adjusted to position it at the drawoff point. The breakpoint temperature then existing was taken as the breakpoint control temperature to be employed in operating the column (i.e. 93° C. in this instance). It will be recognized, of course, that breakpoint temperature is a function of feedstock composition and column pressure.

A liquid purge stream was withdrawn from tray 20, continuously and at a rate of approximately 0.103 gram per minute. At this withdrawal rate the purge contained a substantial portion of the intermediate-boiling impurities, such as ethyl acetate, contained in the feedstock without constituting a serious loss of vinyl acetate. It also contained a substantial amount of the butyraldehyde generated within the column and the amount generated had been greatly reduced by the manner in which the column was operated.

With the column operating as described above, chemical analyses of the vinyl acetate product, the aqueous phase withdrawn from the decanter, the purge stream, and the residue were as follows:

| | Product | Aqueous phase | Purge | Residue |
|---|---|---|---|---|
| Vinyl acetate, wt. percent | 84.0 | 1.4 | 28.6 | 0.0017 |
| Water, wt. percent | 1.8 | 91.0 | 7.0 | 0.06 |
| Acetic acid, wt. percent | <0.5 | <0.5 | 35.0 | 97.0 |
| Acetaldehyde, wt. percent | 14.0 | 8.0 | 0.01 | [1] N.D. |
| Formic acid, wt. percent | | | 12.0 | |
| Butyraldehyde, p.p.m. | 20 | | 80 | |
| Ethyl acetate, p.p.m. | 600 | | 38,000 | |
| 1,3-dioxolane, p.p.m. | 40 | | 1,700 | |
| Methyl ethyl ketone, p.p.m. | [1] N.D. | | 144 | 37 |
| Vinyl propionate, p.p.m. | 30 | | 62,000 | |
| 3-acetoxy-1-butene, p.p.m. | [1] N.D. | | 28,000 | |
| 1-acetoxy-1-butene, p.p.m. | [1] N.D. | | 9,000 | |

[1] N.D.=None detectable.

EXAMPLE II

A liquid feedstock similar to that employed in Example I and having a composition as tabulated below as fed continuously to a one-inch 55-tray distillation column having the same distillate recovery system and the same reboiler and column temperature control system described in Example I. Operations differed from that described in Example I, however, in that column temperature was controlled at about 82° C. between trays Nos. 15 and 17, and no purge stream was withdrawn from the column. That is, the only streams withdrawn were the distillate and the residue stream. Feed rate was about 7.25 grams per minute, residue withdrawal rate was about 4.7 grams per minute, net production rate of the upper liquid phase from the decanter comprising predominantly vinyl acetate was about 2.1 grams per minute, reflux rate was about 17.0 grams per minute and the rate of production of lower (aqueous) phase from the decanter was about 0.95 gram per minute. Compositions of the feedstock and of the streams withdrawn from the column were found to be as follows:

With the column operating as described above, analyses of the crude feedstock and the several streams recovered from the column were as follows:

| Components | Feed | Product | Aqueous phase | Purge | Side-stream | Residue |
|---|---|---|---|---|---|---|
| Vinyl acetate, wt. percent | 25.5 | 82.5 | 1.2 | 19 | <0.1 | |
| Water, wt. percent | 8.8 | 1.2 | 87.0 | | 0.72 | |
| Acetic acid, wt. percent | 55 | <1.0 | | 22.0 | 92.7 | 53.0 |
| Acetaldehyde, wt. percent | 6.0 | 16.0 | 10.0 | | | |
| Butyraldehyde p.p.m. | | 75 | | 85 | | |
| Ethyl acetate, p.p.m. | 867 | 1,300 | | 40,600 | 68 | 15 |
| Methyl ethyl ketone, p.p.m. | 100 | 65 | | 800 | 20 | 5 |
| 1,3-dioxolane, p.p.m. | 97 | 92 | | 5,000 | 34 | 5 |
| 2-methyl-1,3-dioxolane, p.p.m. | 980 | 25 | | 15,000 | 60 | 20 |
| Vinyl propionate, p.p.m. | 4,200 | 316 | | 420,000 | 289 | 50 |
| Crotonaldehyde, p.p.m. | 500 | 10 | | 18,000 | 15 | |
| 3-acetoxy-1-butene, p.p.m. | 930 | <5 | | 20,000 | 500 | |
| 1-acetoxy-1-butene, p.p.m. | 120 | <5 | | 1,000 | 70 | 15,000 |

| | | Decanter | | |
|---|---|---|---|---|
| | Feed | Light phase | Heavy phase | Residue |
| Vinyl acetate, wt. percent | 22.3 | 77.8 | 1.5 | 0.035 |
| Water, wt. percent | 13.0 | 1.8 | 87.0 | 0.13 |
| Acetaldehyde, wt. percent | 7.0 | 18.3 | 11.0 | |
| Butyraldehyde, p.p.m. | ¹3 | 20 | | |
| Ethyl acetate, p.p.m. | 636 | 112 | | 850 |
| Methyl ethyl ketone, p.p.m. | 128 | 10 | | 138 |
| 1,3-dioxolane, p.p.m. | 179 | 29 | | 195 |
| 2-methyl-1,3-dioxolane, p.p.m. | 1,680 | 4 | | 1,900 |
| Vinyl propionate, p.p.m. | 2,500 | 10 | | 3,050 |
| Crotonaldehyde, p.p.m. | 520 | ²N.D. | | 700 |
| 3-acetoxy-1-butene, p.p.m. | 610 | ²N.D. | | 600 |
| 1-acetoxy-1-butene, p.p.m. | 97 | ²N.D. | | 100 |

¹ Approximately.
² N.D.=None detectable.

EXAMPLE III

A 55-tray distillation column was operated at a head pressure of 12 lbs. per square inch gauge and with, as will be explained, 3 drawoff streams below the feed point, which was at tray No. 40: (1) a purge stream drawn from the temperature breakpoint at tray 20, (2) an acetic acid vapor sidestream withdrawn above tray No. 2, and (3) a high-boiling residue withdrawn from an auxiliary reboiler, which was a high-temperature falling-film evaporator operating to strip the liquid in the column base to an acetic acid content of about 53% before being finally discharged. The column was equipped with a distillate decanter, separating an upper vinyl acetate-containing liquid phase from a lower aqueous phase as in the preceding examples, operating at approximately 25° C. Operation of the reflux system differed slightly from that in the preceding examples in that a portion of the reflux was drawn from the upper decanter phase while a portion was a 98% vinyl acetate stream which was incorporated into the reflux for the purpose of minimizing the tendency of the water contained in the distillate to migrate into the upper decanter phase.

The column temperature at tray 20, the temperature breakpoint, was 105° C.

Flow rates, all expressed as gallons per minute per square foot of column cross-section were as follows: feed, 1.40; distillate drawn off from the decanter, 0.48; aqueous phase drawn off from the decanter, 0.140; purge stream withdrawn from tray 20, 0.0127; high-boiling residue from the reboiler evaporator, 0.038; and reflux, 2.19 (including 10 volume percent vinyl acetate incorporated into the reflux as explained above).

The embodiments of the invention in which an exclusive property or privilege is claimed are defined as follows:

1. A process for recovering (a) a purified vinyl acetate cut substantially free of heavy ends including ethyl acetate and (b) a dry acetic acid cut from a crude feedstock comprising vinyl acetate, water, heavy ends comprising ethyl acetate, and acetic acid, which process comprises:
   (a) introducing said crude feedstock continuously into a distillation column at a feed point intermediate between the base and the head of said column;
   (b) continuously supplying boilup heat to the base of said column;
   (c) continuously withdrawing from the head of said column vapors comprising vinyl acetate, water, and all components of said crude feedstock which are more volatile than vinyl acetate;
   (d) condensing said overhead vapors, cooling the condensate to a temperature at which two liquid phases form therein, and drawing off the lower of said phases, comprising predominantly water;
   (e) returning a portion of the upper of said two liquid phases, comprising predominantly vinyl acetate essentially free of said heavy ends, to the top of said column as reflux;
   (f) withdrawing the remainder of said upper phase as said purified vinyl acetate cut;
   (g) continuously withdrawing, from a base drawoff connection in the lower portion of said column below the feed point, a base stream constituting said dry acetic acid cut;
   (h) controlling the introduction of said reflux into said column at a rate at least great enough that the vinyl acetate contained in said reflux and in said feedstock is sufficient to satisfy the vinyl acetate azeotrope requirements of substantially all of the water contained in said crude feedstock;
   (i) controlling the application of said boilup heat to said column at a rate at least high enough that the water content of said base stream does not exceed about 1% by weight, but below that rate at which the location of the temperature breakpoint in said column becomes established at a level substantially higher than the immediate vicinity of the feed point; and
   (j) continuously withdrawing from said column, from at least one drawoff point located below the feed point thereof, a drawoff consisting of at least one drawoff stream comprising said heavy ends, said stream containing at least a portion of the ethyl acetate and any heavy ends boiling higher than vinyl acetate contained in said crude feedstock.

2. The process of claim 1 wherein said heavy ends comprise predominantly ethyl acetate.

3. The process of claim 1 wherein said drawoff comprises two streams; (a) said base stream and (b) a purge stream drawn from the column in the immediate vicinity of the temperature breakpoint, said base stream being withdrawn from the column at a rate sufficient to remove therein from said column substantially the entirety of the acetic acid in said feedstock and said purge stream being withdrawn at a rate sufficient to prevent the appearance of more than a set maximum amount of ethyl acetate in the vapors withdrawn from the head of said column being operated in such a manner as to maintain the temperature breakpoint below the feed point and above the base drawoff connection.

4. The process of claim 3 wherein said heavy ends comprise predominantly ethyl acetate.

5. The process of claim 3 wherein said heavy ends comprise ethyl acetate, methyl ethyl ketone, butyraldehyde, vinyl propionate, ethylene glycol acetates, 1,3-dioxolane and 1-acetoxy-1-butene and wherein the purge stream comprises ethyl acetate, methyl ethyl ketone, butyraldehyde, vinyl propionate, and 1,3-dioxolane and the base stream comprises 1-acetoxy-1-butene and ethylene glycol acetates.

6. The process of claim 5 wherein said column is a tray-type column having at least about 40 trays with the feed point being located at about tray No. 30 (counting from the bottom), the purge stream being drawn from about tray No. 18, reflux being introduced onto tray No. 40, the base stream being drawn from the base of the column, and the temperature breakpoint being maintained at about tray No. 18.

7. The process of claim 5 wherein the column is a tray-type column having about 60 trays, the feed point is located at about tray No. 40, the purge stream is drawn from about tray No. 22, the reflux is introduced onto tray No. 60, and the base stream is withdrawn from the base of the column.

8. The process of claim 5 wherein the crude feedstock contains acetaldehyde and wherein said acetaldehyde is recovered in the distillate recovered from the head of said column.

9. The process of claim 5 comprising the additional step of resolving said base stream, by distillation, into a residue comprising 1-acetoxy-1-butene and ethylene glycol acetates and a distillate comprising predominantly acetic acid suitable for reaction with ethylene to form vinyl acetate.

10. The process of claim 9 wherein the method of distilling said base stream comprises withdrawing from said column, at a point between the base thereof and the purge drawoff point, a vapor comprising predominantly acetic acid; condensing said vapor to form said distillate; and withdrawing from the base of said column a bottoms stream constituting said residue.

11. The process of claim 1 wherein said drawoff is said base stream consisting essentially of acetic acid and said heavy ends and wherein said temperature breakpoint is maintained at a location below the feed point.

12. The process of claim 11 wherein said heavy ends comprise ethyl acetate.

13. The process of claim 11 wherein said heavy ends comprise ethyl acetate, 1-acetoxy-1-butene, and ethylene glycol acetates.

14. The process of claim 13 wherein said heavy ends comprise ethyl acetate, methyl ethyl ketone, butyraldehyde, vinyl propionate, 1,3-dioxolane, 1-acetoxy-1-butene, and the acetates of ethylene glycol and 1,1-ethanediol.

15. The process of claim 13 wherein said column is a tray-type column having at least about 55 trays with the feed point being located at about tray No. 40 (counting from the bottom), reflux being introduced onto tray No. 55, the base stream being withdrawn from the base of the column, and the temperature breakpoint being maintained between about tray No. 15 and tray No. 20.

16. The process of claim 14 wherein the base stream is to be forwarded as a feedstock to the reaction step of a process in which acetic acid and ethylene are reacted catalytically in the presence of molecular oxygen to form vinyl acetate and wherein, prior to being employed in said reaction step, said base stream is separated by distillation into a residue comprising 1-acetoxy-1-butene and ethylene glycol acetates and a distillate substantially free of 1-acetoxy-1-butene and comprising predominantly acetic acid.

References Cited

UNITED STATES PATENTS

| | | | |
|---|---|---|---|
| 3,438,870 | 4/1969 | Roscher et al. | 203—99 X |
| 3,458,406 | 7/1969 | Fisher et al. | 203—44 |
| 3,415,872 | 12/1968 | Karnofsky | 260—499 X |
| 3,290,362 | 12/1966 | Schaeffer | 260—497 |
| 2,997,495 | 8/1961 | Rutledge et al. | 260—499 X |
| 3,280,178 | 10/1966 | Barbour | 203—498 |
| 3,113,851 | 12/1963 | Fukita et al. | 203—42 X |

FOREIGN PATENTS

| | | | |
|---|---|---|---|
| 586,489 | 3/1947 | Great Britain | 260—499 |
| 1,133,719 | 7/1962 | Germany | 260—499 |

WILBUR L. BASCOMB, Jr., Primary Examiner

U.S. Cl. X.R.

203—2, 99, DIG. 10; 260—499, 497 A